(12) United States Patent
George et al.

(10) Patent No.: US 9,277,168 B2
(45) Date of Patent: Mar. 1, 2016

(54) SUBFRAME LEVEL LATENCY DE-INTERLACING METHOD AND APPARATUS

(75) Inventors: Rex George, Round Rock, TX (US); Daniel P. Shimizu, Hillsborough, CA (US); Sateesh Lagudu, Hyderabad (IN); Niranjan P. Dasiga, Secunderabad (IN); Sai Kishore Reddipalli, Hyderabad (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 58 days.

(21) Appl. No.: 13/549,940

(22) Filed: Jul. 16, 2012

(65) Prior Publication Data

US 2014/0002733 A1    Jan. 2, 2014

(30) Foreign Application Priority Data

Jun. 29, 2012    (IN) .......................... 2605/CHE/2012

(51) Int. Cl.
*H04N 7/01* (2006.01)
*H04N 11/20* (2006.01)
*H04N 5/14* (2006.01)

(52) U.S. Cl.
CPC ............... *H04N 7/012* (2013.01); *H04N 7/014* (2013.01); *H04N 5/144* (2013.01)

(58) Field of Classification Search
USPC .............................. 348/452, 669, 489, E7.007
See application file for complete search history.

(56) References Cited

U.S. PATENT DOCUMENTS

| | | | |
|---|---|---|---|
| 6,381,277 B1 | 4/2002 | Chun et al. | |
| 6,680,752 B1 | 1/2004 | Callway | |
| 6,970,206 B1 | 11/2005 | Swan | |
| 7,271,841 B2 | 9/2007 | Swan | |
| 7,990,471 B1 | 8/2011 | Otobe et al. | |
| 2002/0171759 A1 | 11/2002 | Handjojo et al. | |
| 2005/0078214 A1* | 4/2005 | Wong .................... | H04N 7/014 348/452 |
| 2005/0219411 A1 | 10/2005 | Chang | |
| 2006/0018383 A1* | 1/2006 | Shi ........................ | G06T 7/2006 375/240.16 |
| 2008/0246884 A1* | 10/2008 | Chung .................. | H04N 5/145 348/699 |

(Continued)

OTHER PUBLICATIONS

DVDO iScan VP50—High Definition Video Processor, at least as early as Jun. 2012, downloaded from http://www.lsk.hu/products/dvdo/data/iscanvp50.pdf, 2 pgs.

(Continued)

*Primary Examiner* — Jefferey Harold
*Assistant Examiner* — Omer Khalid
(74) *Attorney, Agent, or Firm* — Faegre Baker Daniels LLP

(57) ABSTRACT

A new motion adaptive deinterlacing method and apparatus detects motion corresponding to a pixel to be interpolated. The method and apparatus generates a subframe level motion map based on at least a portion of a current field and at least a portion of a plurality of previous fields. Based on the generated subframe level motion map, the apparatus and method generates a plurality of motion vectors associated with the subframe level motion map by applying a plurality of motion masks, associated with the pixel to be interpolated, to the subframe level motion map. The apparatus and method further generates deinterlaced content by adaptively interpolating the pixel to be interpolated for the current field based on the plurality of motion vectors produced by applying a plurality of motion masks to the subframe level motion map.

25 Claims, 15 Drawing Sheets

(56) References Cited

U.S. PATENT DOCUMENTS

| | | |
|---|---|---|
| 2008/0260021 A1 | 10/2008 | Sung |
| 2009/0086093 A1 | 4/2009 | Wei |
| 2010/0110304 A1* | 5/2010 | Chen .................... H04N 5/21 348/701 |
| 2010/0309372 A1 | 12/2010 | Zhong |

OTHER PUBLICATIONS

VDINT-MA Motion Adaptive Deinterlacer Core, at least as early as Jun. 2012, downloaded from http://www..cast-inc.com/ip-cores/video/vdint-ma/, 2 pgs.

ABT1030 Video Processor, at least as early as Jun. 2012, downloaded from http://www..semiconductorstore.com/pdf/newsite/SiliconImage/ABT1030.pdf, 2 pgs.

Altera High Definition Video Processor Design UDX4, Jun. 2011, downloaded from http://www..altera.com/literature/an/an627.pdf, in Jun. 2011, 39 pgs.

AMD Press Release—downloaded from http://www..amd.com/us/press-releases/Pages/amd-and-nintendo-join-2011june07.aspx, on Jun. 7, 2011, 1 pg.

International Search Report and Written Opinion; EP Patent Office; International Application No. PCT/US2013/047007; dated Oct. 22, 2013.

* cited by examiner

| 0 | 1 | 1 | 1 | 0 | 0 | 0 | 0 | 0 |
|---|---|---|---|---|---|---|---|---|
| 0 | 0 | 1 | 1 | 1 | 0 | 0 | 0 | 0 |
| 0 | 0 | 1 | 1 | 1 | 0 | 0 | 0 | 0 |
| 0 | 0 | 0 | 1 | 1 | 1 | 0 | 0 | 1 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 1 |

| 1 | 1 | 1 | 1 | 1 | 1 | 1 | 1 | 1 |
|---|---|---|---|---|---|---|---|---|
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 0 | 0 | 0 | 0 | 0 | 0 |
| 1 | 1 | 1 | 0 | 0 | 0 | 0 | 0 | 0 |
| 1 | 1 | 1 | 0 | 0 | 0 | 0 | 0 | 0 |
| 1 | 1 | 1 | 0 | 0 | 0 | 0 | 0 | 0 |
| 1 | 1 | 1 | 0 | 0 | 0 | 0 | 0 | 0 |
| 1 | 1 | 1 | 0 | 0 | 0 | 0 | 0 | 0 |

FIG. 6

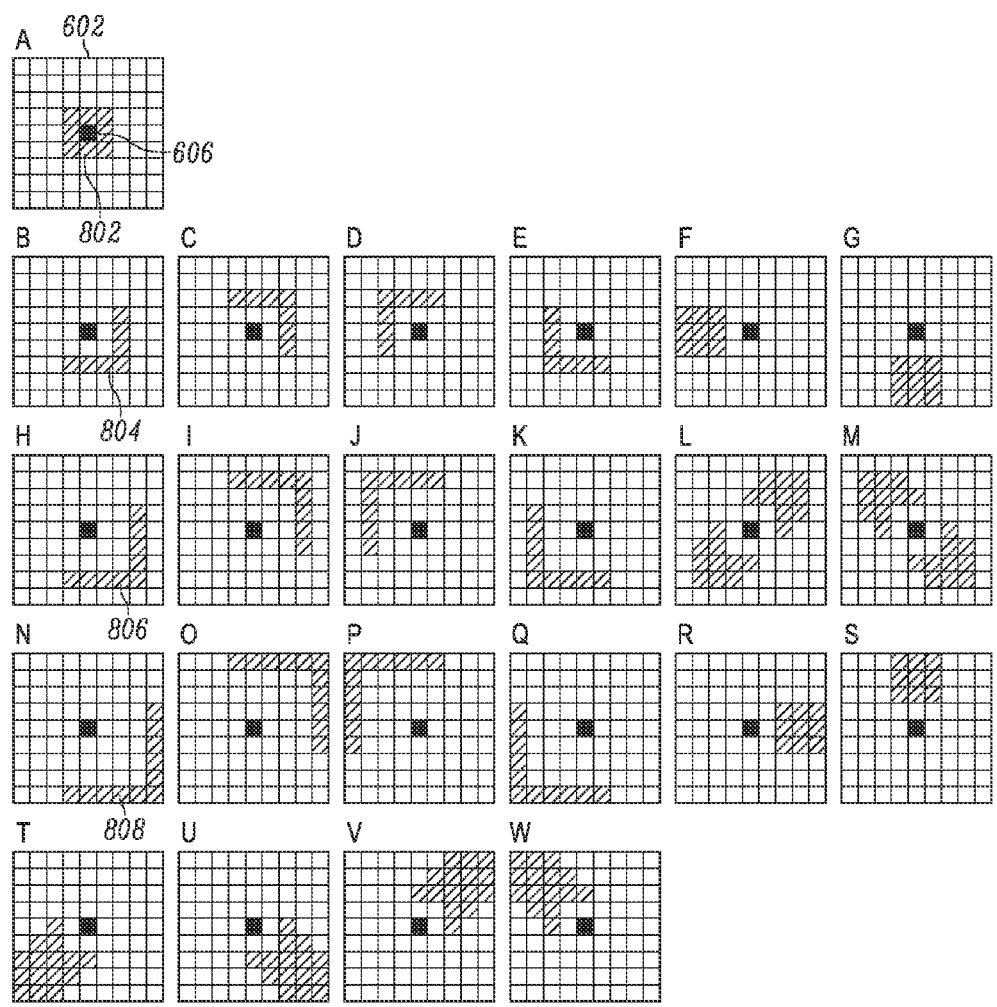
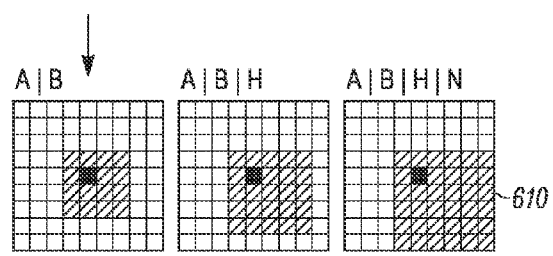
MOTION MASKS
FIG. 8

SUBFRAME LEVEL LATENCY DE-INTERLACING METHOD AND APPARATUS

FIELD OF THE DISCLOSURE

The disclosure relates generally to methods and devices for de-interlacing video for display on one or more progressive displays and more particularly to methods and apparatus for de-interlacing interlaced video using motion detection and/or motion estimation techniques.

BACKGROUND OF THE DISCLOSURE

Interlacing is a well known technique that captures two consecutive fields in succession at a rate twice a normal frame rate. One of such consecutive fields contains only odd lines and the other contains only even lines of a whole frame. In other words, interlacing provides half-resolution fields at twice the normal frame.

Progressive display devices display all lines of a frame at every refresh. In order for progressive display devices to display interlaced content, de-interlacing capability must be added to assist progressive display devices. In theory, de-interlacing would be as simple as combining two consecutive interlaced fields into a single frame, which is generally known as weaving in the art. However, interlaced fields are captured at different points in time and thus weaving could cause picture quality problem leading to visual defects when motions exist in the picture. Such a picture quality problem is called an interlace artifact. Blending is another technique that averages consecutive fields to be displayed as one frame. Likewise, blending also causes a de-interlacing artifact called ghosting, where picture quality as well as the temporal resolution, i.e. motion, loses, albeit to a lesser degree as compared to weaving.

Motion Adaptive De-interlace (MAD) is designed to overcome interlace artifacts. MAD techniques typically enhance picture qualities by incorporating weaving, blending and frame extension methods, such as the "bob" as generally known in the art. Specifically, MAD predicts direction and amount of image motion between successive sub-fields to blend the sub-fields together. As a result, MAD creates good picture quality for progressive display.

Various applications based on MAD are well known in the art. The existing MAD applications work based on differences of the pixels over a window of sum of the medians of temporal or spatial pixels in a window to get the relative motion across the pixels. Most of these applications estimate the differences or standard deviations on the progressive frames, i.e. previous interpolated frames, to detect the motion movement and hence results in a minimum latency of one frame to compute the interpolated pixels. They require storage of progressive frames, which double the size of the interlaced field, and have computational delay to interpolate the pixels for at least one progressive frame.

However, unnecessary latency resulting from traditional MAD techniques may have negative impact on user experience. For example, addition of a de-interlacing feature to support the high definition quality picture on progressive displays in existing integrated circuit chips requires additional hardware added to the video data path; as a result, loss of synchronization between audio and video can take place. Also, in the case of video gaming applications, additional de-interlacing hardware on the video data path could add significant observable delay between the user commands and video response such that the user gaming experience is degraded.

Moreover, memory organization techniques associated with traditional MAD typically use one frame buffer to store the final interpolated frame and three field buffers to store three past fields. Under such an approach, for example when the pixels are captured in 4:4:4 format, the frame buffer has to be stored in 4:4:4 AYCrCb8888 format. Accordingly, to store the 720×480 size image, the traditional memory organization techniques take memory storage of 720×480×32-bits i.e. 1382400 bytes. This memory storage cannot be optimized because the downstream computing engine expects to receive the pixel data in AYCrCb8888 format. In cases where some of traditional MAD techniques perform 422 to 444 conversions on the fly during the interpolation, 720×240×16 bit i.e. 345600 bytes, of memory storage are required to store 720×240YCbCr422, and therefore 4 fields of such require memory storage of 1382400 bytes. The traditional MAD techniques also typically organizes intermediate pixel data in a linear mode, such that each field of pixel data are continuously stored in a different field buffer. Under such an approach, accessing pixel data in consecutive fields for a position associated with the frame being interpolated requires multiple memory access to different field buffers within the storage buffer.

Therefore, there is a need for a solution to maintain de-interlacing latency and memory accessing of intermediate pixel data for interpolation at a minimum level to improve the traditional MAD techniques.

BRIEF DESCRIPTION OF THE DRAWINGS

The features of the present disclosure together with the advantages thereof, may be understood by reference to the following description taken in conjunction with the accompanying drawings where:

FIG. 6 generally illustrates an example of generating a subframe level motion map with in a 9×9 search window associated with a pixel to be interpolated in accordance with one embodiment of the disclosure;

FIG. 8 generally illustrates a block diagram of various programmable motion masks within a search window associated with a pixel to be interpolated in accordance with one embodiment of the disclosure;

DETAILED DESCRIPTION OF THE PREFERRED EMBODIMENTS

Figure 1:
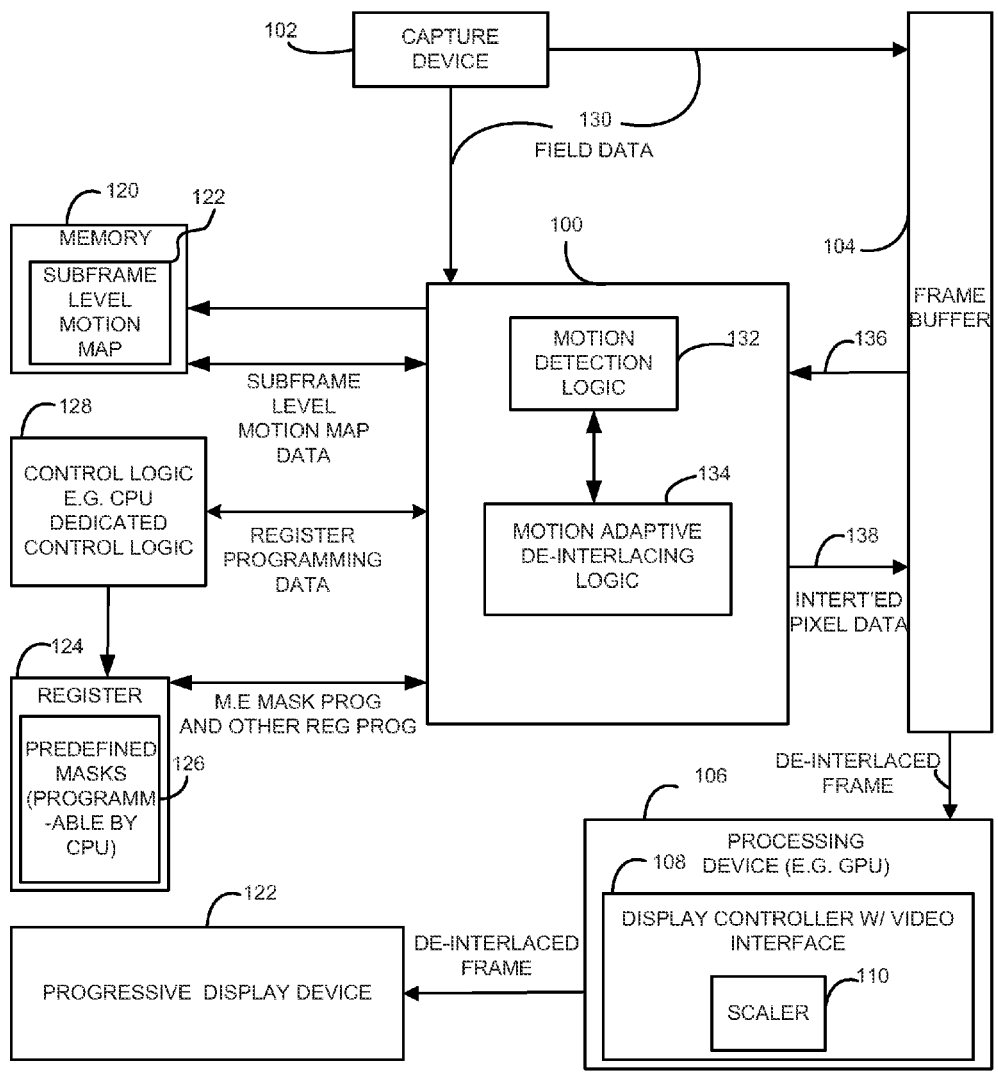
FIG. 1 is a block diagram generally depicting one embodiment of a de-interlacing system de-interlacing interlaced video for progressive display using subframe level motion map information in accordance with the disclosure.

A method and apparatus for de-interlacing interlaced video detects motion movement using a subframe level motion map to generate progressive pixels of the missing lines in an interlaced field, having a subframe level latency. To achieve this, the method and apparatus includes generating a subframe level motion map based on at least a portion of a current field (e.g. five lines) and at least a portion of a plurality of previous fields (e.g. three fields). Once the subframe level motion map is generated, the method and apparatus includes producing a plurality of motion vectors associated with the subframe level motion map by applying a plurality of motion masks associated with a pixel to be interpolated to the subframe level motion map. The method further includes generating de-interlaced video by adaptively interpolating the pixel to be interpolated for the current field based on the plurality of motion vectors produced.

Among other advantages, the method de-interlaces interlaced video with a processing delay in the order of lines within a current field. In one example, the method uses one current field and three previous fields to interpolate the missing pixels in the interlaced field with a processing latency of 5 lines, a significant shortened delay as compared to the traditional MAD techniques. Thus, the method achieves a subframe, i.e. less than one frame or field, processing level latency.

In one embodiment, the method generates a subframe level motion map by comparing the temporal differences for both luminance and chrominance components of the pixels corresponding to a portion of a current field being captured (e.g. five lines) and a portion of a plurality of previous fields that have been captured (e.g. three past fields). The absolute differences for the luminance and chrominance components of the pixels are compared with a threshold. Results of the luminance and chrominance comparison are marked using bimodal data, such as Boolean. One of the bimodal data values is used to indicate that relative motion for a pixel exists and the other bimodal data value is used to indicate such motion does not exist.

In another embodiment, the method generates two or more motion vectors associated with a pixel to be interpolated, i.e. a missing pixel, preferably by AND'ing the subframe level motion map of temporal differences, e.g. the bimodal data values indicating the luminance and chrominance differences of the pixels, with a set of predefined motion masks within a search window. The search window is selected according to an optimal size, e.g. 9(lines)×9(pixels). This search window is centered on the missing pixel. The motion masks can be programmed by control logic in terms of the size, shape and number. It is recognized that the algorithms to program the motion masks as such are generally known in the art. Motion vectors are preferably produced by OR'ing results of the AND'ing operation to indicate whether motion exists in the areas of interest selected by the predefined motion masks. One of such bimodal data values indicates relative motion in the neighboring pixels exists for the missing pixel. The other of such bimodal data values indicates such relative motion does not exist for the missing pixel. Further, a motion value is preferably generated by OR'ing all the motion vectors to indicate whether motion exists for the missing pixel within the search area.

In another embodiment, the method generates de-interlaced video by adaptively interpolating the pixel to be interpolated for the current field based on the motion value, i.e. determining whether to use spatial or temporal interpolation to interpolate a missing pixel. If the motion value indicates motion does not exist in the areas surrounding the missing pixel within the search window, then temporal spatial interpolation is performed, e.g. copying captured pixels from previous fields. If the motion value indicates motion exists in the areas surrounding the missing pixel within the search window, then spatial interpolation is performed, e.g. "BOB", "ELA" or other spatial algorithms as known in the art. Further, in the case of spatial interpolation, alpha blending is also preferably performed for the missing pixel and the level of alpha blending for the missing pixel is determined based on the number of motion vectors that indicate motion exist in areas of interest selected by the predefined motion masks.

Also to minimize the processing delay for the method above, methods related organizing and accessing field pixel data in a single pixel domain are disclosed. The improvement in accessing pixel data more efficiently as compared with techniques used by traditional MAD is achieved by storing the subframe level motion map in a memory storage, wherein a corresponding array in the memory storage holds a line of the subframe level motion map, and outputting the subframe level motion map stored in the memory storage one array at a time. The improvement in organizing pixel data as compared with techniques used traditional MAD is achieved by storing the plurality of pixels of the at least a portion of the current field and the at least a portion of the plurality of previous fields in a memory buffer by interleaving.

Among other advantages, the method and apparatus organizes and accesses field pixel data using interleaving memory organization and efficient memory accessing technique. Accordingly, the method and apparatus organizes and accesses field pixel data facilitates interpolation of the pixels with data flow operated in single clock domain in a pipeline manner.

The following description of the embodiments is merely exemplary in nature and is in no way intended to limit the disclosure, its application, or uses. As used herein, the terms "motion detection logic," "motion de-interlacing logic," "logic," "AND operation" "OR operation" and/or "device" can include, as known in the art, electronic circuits, one or more processors (e.g., shared, dedicated, or group of processors such as but not limited to microprocessors, DSPs, or central processing units) and memory, that execute one or more software or firmware programs, combinational logic circuits, an ASIC, and/or other suitable components that provide the described functionality. Additionally, as known in the art, the term "signal" may refer to one or more analog or digital signals. Furthermore, as will be appreciated by those of ordinary skill in the art, the layout of a "motion detection logic" "motion de-interlacing logic" "AND operation" "OR operation" and/or "device" can be described in a hardware description language such as Verilog™, VHDL, and/or other suitable hardware description languages.

FIG. 1 shows generally one example of a subframe level latency motion adaptive de-interlacer 100 operative to perform adaptive de-interlacing at a subframe level in accordance with one embodiment of the method described above. The subframe level latency motion adaptive de-interlacer 100 includes motion detection logic 132 and motion adaptive de-interlacing logic 134. It is noted that motion detection logic 132 and motion adaptive de-interlacing logic 134 referred to herein are any suitable executing software module, hardware, executing firmware or any suitable combination thereof that can perform the desired function, such as programmed processors, discrete logic, for example, state machine, to name a few. It is also understood that, although motion detection logic 132 and motion adaptive de-interlacing logic 134 are illustrated in this example as discrete to each other, in some other examples they may be combined to form integrated logic operative to detect motion values associated with a missing pixel and as well as interpolated the missing pixel based on the motion values.

Also shown are a memory storage 120, which contains a subframe level motion map 122, and control logic 128 that controls a register 124. The register 124 contains predefined motion masks 126. In this example, the subframe level latency motion adaptive de-interlacer 100 receives captured field data 130 from a capturing device 102, such as a camera, game console, or any other suitable device that can capture interlaced video stream as known in the art.

In this example, the motion detection logic 132 is operative to identify moving areas in the fields to be de-interlaced. The motion detection logic 132 generates a subframe level motion map 122 based on the current captured field data 130 and previous field data 136 stored in the frame buffer 104. Further details of the subframe level motion map generated by the motion detection logic 132 are described in FIGS. 3-6. As shown, the subframe level motion map 122 is stored in the memory 120, which may be any suitable storage device as generally known in the art. In this example, the motion detection logic 132 is also operative to produce motion vectors associated with each missing pixel, a motion value for each missing pixel based on the motion vectors, and Alpha coefficient for Alpha blending. In one example, the motion detection logic 132 produces motion vectors associated with a missing pixel by combining the subframe level motion map 122 with a plurality of predefined motion masks 126. The predefined motion masks 126 are preferably programmed by control logic 128 and are stored in a register 124 controlled by the control logic 128. The control logic 128 may program predefined motion masks 126 by defining, for example, sizes, shapes or any other suitable parameters associated with programming motion masks for MAD as generally known in the art. In addition, the control logic 128 may also control the subframe level latency motion adaptive de-interlacer 100, for example, by enabling or disabling the subframe level latency motion adaptive de-interlacer 100. It is noted that the control logic 128 referred to herein is any suitable executing software module, hardware, executing firmware or any suitable combination thereof that can perform the above-described function, such as programmed processors, discrete logic, for example, state machine, to name a few.

In this example, the motion detection logic 132 is also operative to produce motion values associated with missing pixels. Motion values can be used to indicate whether motion exists in areas of interest selected by the predefined motion masks 126. Based on the motion values produced by the motion detection logic 132, the motion de-interlacing logic 134 is operative to adaptively de-interlace field to be interlaced by applying temporal or spatial, such as but not limited to, "BOB" and "ELA", interpolation and by alpha blending. Further details of the adaptive de-interlacing operation performed by the motion de-interlacing logic 134 are described in FIG. 11.

As still shown in this example, the subframe level latency motion adaptive de-interlacer 100 is also operative to output interpolated field data 138 to a frame buffer 104 operatively coupled to the subframe level latency motion adaptive de-interlacer 100. Also shown, a processing device 106, such as a graphics processor unit (GPU), is operative to receive from frame buffer 104 the de-interlaced frames. In this example, the processing device 106 is further operative to process the de-interlaced frames using a display controller 108 having a scaler 110, or any other suitable or equivalent device as known in the art to perform display controlling and/or scaling functions. As also shown, the processing device 106 is also operative to send the processed de-interlaced frames to the progressive display device 122 for display as progressive frames.

Figure 2:
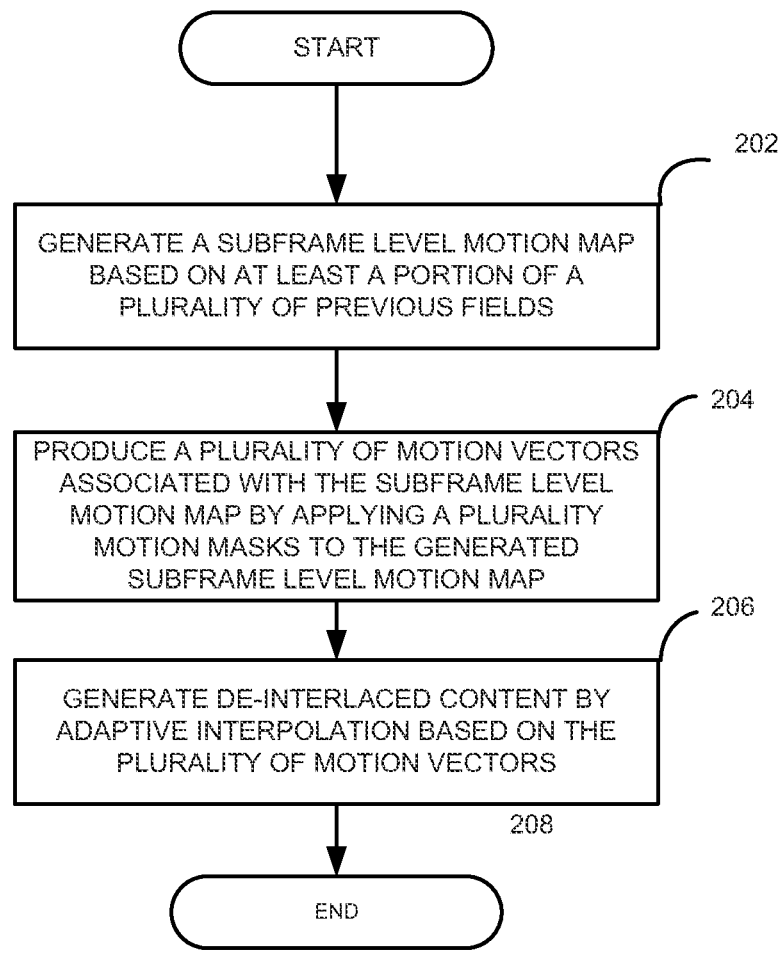
FIG. 2 is a flow diagram generally depicting a method of adaptively de-interlacing interlaced video for progressive display using subframe level motion map information in accordance with the disclosure.

Referring to FIGS. 1-2, the operation of the de-interlacer 100 will be explained. At block 202, in operation, the motion detection logic 132 generates a subframe level motion map based on at least a portion of a current field and at least a portion of a plurality of previous fields. At block 204, in operation, the motion detection logic 132 further produces a plurality of motion vectors associated with the subframe level motion map by applying a plurality of motion masks, associated with a pixel to be interpolated, to the subframe level motion map. Proceeding to block 206, based on the plurality of motion vectors produced by the motion detection logic 132, the motion adaptive de-interlacing logic 132 generates deinterlaced content by adaptively interpolating the pixel to be interpolated for the current field. It is understood that although the various methods described herein have been described as being performed by certain functional blocks, that any suitable function block may perform the requisite steps as desired depending on a particular application.

Figure 3:
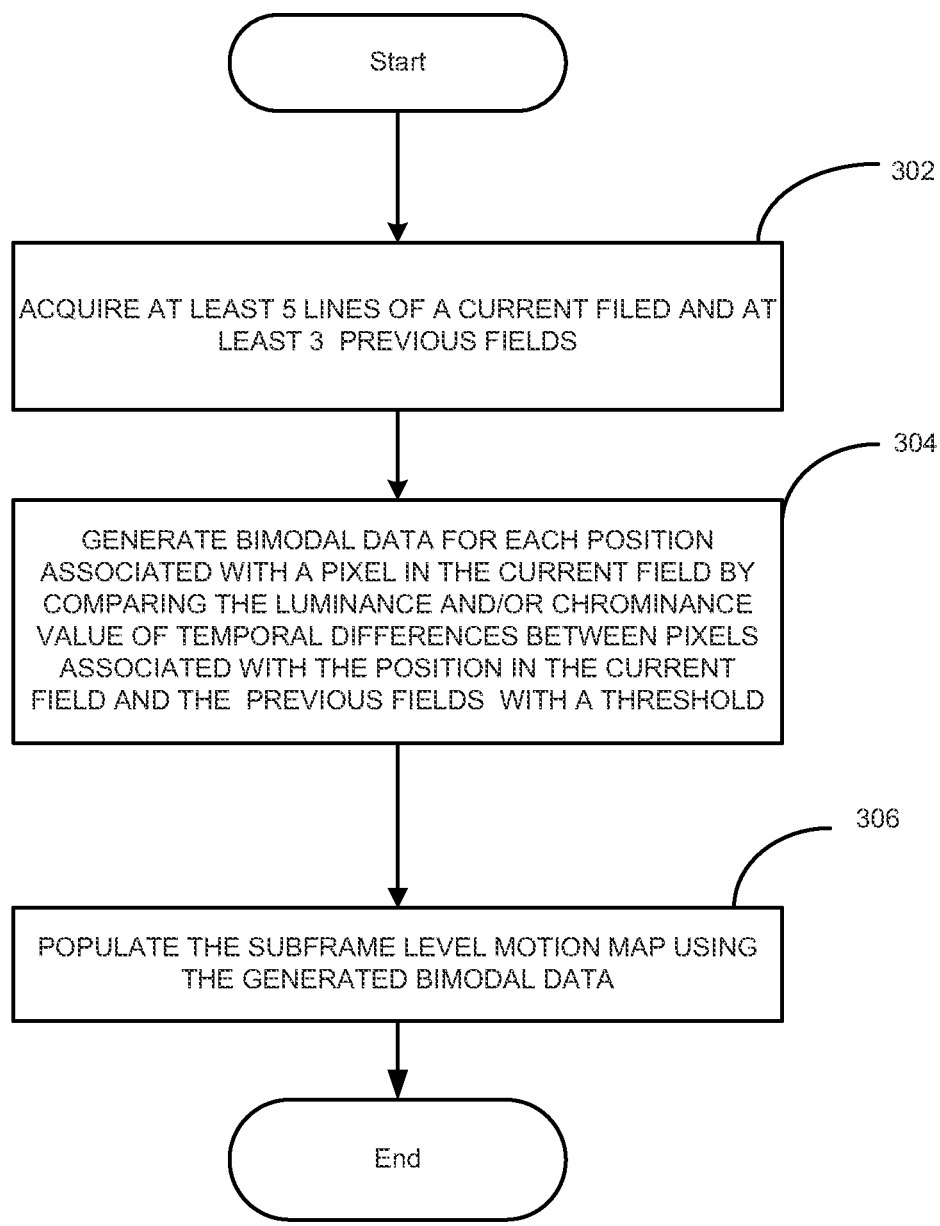
FIG. 3 is a flow diagram generally illustrating a method for generating the subframe level motion map in accordance with one embodiment of the disclosure.
Figure 4:
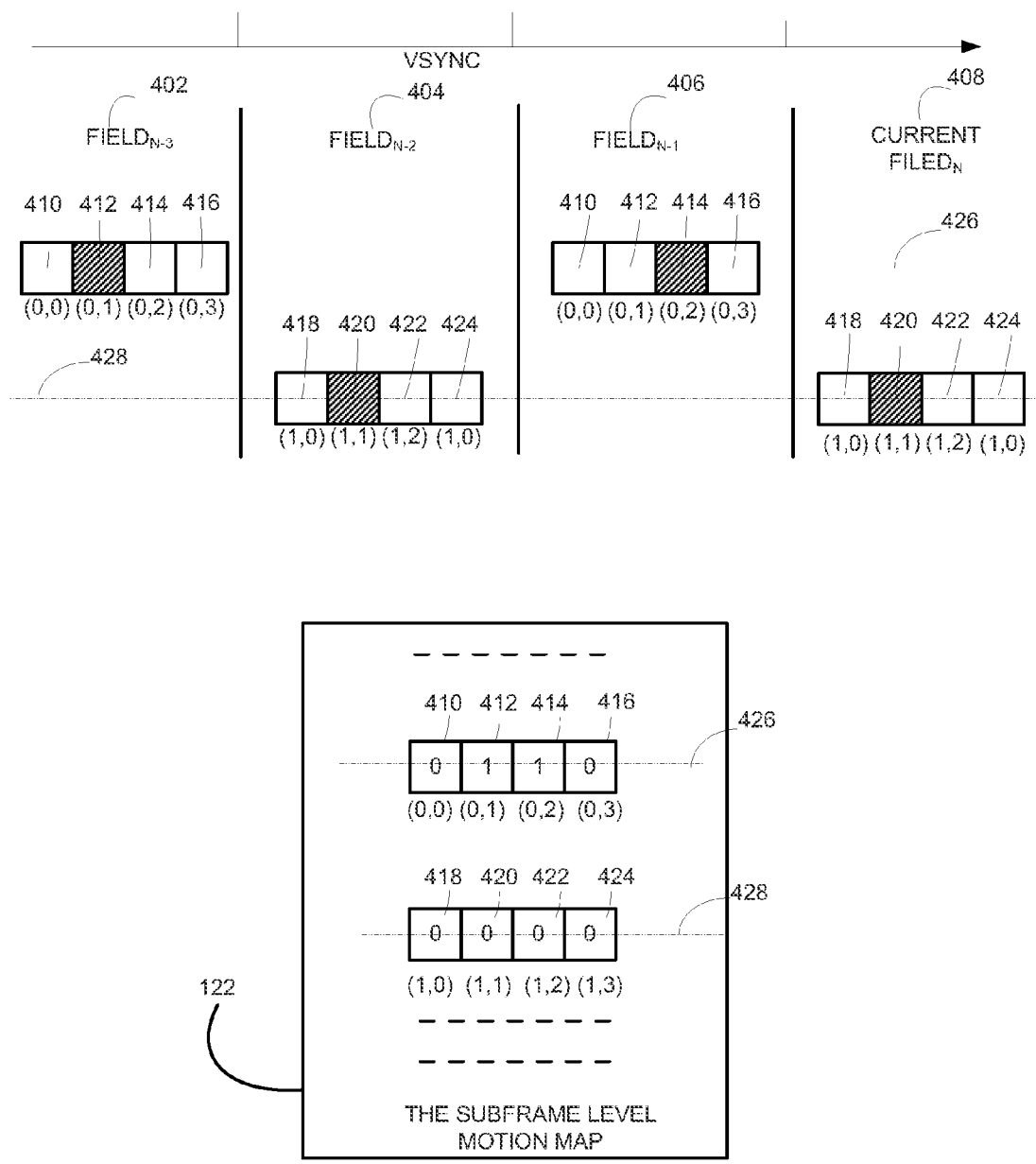
FIG. 4 generally illustrates in details one example of generating subframe level motion map as shown in FIG. 3.

FIGS. 3-6, in combination with FIG. 1, illustrate further details of generating a subframe level motion map in accordance with one embodiment of the method described above. Referring to FIG. 3, an example of generating a subframe level motion map is illustrated. At block 302, in operation, the motion detection logic 132 acquires at least three previous fields and at least five lines of a current field. At block 304, for each position associated with a pixel in the current field, the motion detection logic 132 generates a bimodal value, e.g. Boolean value, by comparing luminance and/or chrominance value of temporal differences between pixels associated with the position in the current field and the previous fields with a threshold. One example of such a comparison is illustrated in FIG. 4. Proceeding to block 306, the motion detection logic 132 populates the subframe level motion map using the generated bimodal data for each position associated with a pixel in the current field.

FIG. 4 illustrates one example of the operations described in FIG. 3. In this example, the current field$_n$ 408 and the previous field$_{n-2}$ 404 contain even lines of a frame, such as the line 428. The previous field$_{n-1}$ 402 and field$_{n-3}$ 406 contain odd lines of the frame, such as the line 426. As shown, four positions 410, 412, 414, 416, are on the line 426 in the frame. As shown, four positions 418, 420, 422, 424, are on the line 428 in the frame. The shaded pixels, as shown, represent that the luminance and/or chrominance values of such pixels are different from non-shaded pixels as compared to a threshold generally known in the art. The temporal luminance and/or chrominance differences between pixels associated with positions 410, 412, 414, 416, 418, 420, 422, 424 are marked using bimodal data, such as Booleans. In this example, the Boolean value "1" represents the temporal luminance and/or chrominance difference exists for a position in the frame and the Boolean value "0" indicates such a difference doesn't exist. As shown, the differences are populated to the subframe level motion map 122 on a subframe level. In this example, luminance and/or chrominance difference at position 410 is marked by the Boolean value "0" as pixels associated the position 410 in field$_{n-3}$402 and field$_{n-1}$406 are not shaded, i.e. their luminance and/or chrominance difference is not greater than the threshold. On the other hand, in this example, luminance and/or chrominance difference at position 412 is marked by the Boolean value "1" as the pixel associated the position 412 in field$_{n-3}$402 is shaded and the pixel associated the position 412 in field$_{n-1}$406 is not shaded, i.e. their luminance and/or chrominance difference is greater than the threshold. Similarly, other positions can be marked by bimodal data in this fashion. As shown, the positions 410, 412, 414, 416 on the line 426 are marked by 0, 1, 1, 0 respectively to indicate the luminance and/or chrominance difference of the pixels associated with these positions. Likewise, the positions 418, 420, 422, 424 on the line 428 are marked by 0, 0, 0, 0 respectively. The bimodal data are then populated in the motion map 122, as shown, at each position corresponding to the position in the frame.

One example of generating each odd line bit $F_{n2}$ and even line bit $F_{n1}$ for the subframe level motion map 122 may be represented by the following equations.

$$\{F_{n1}=1\} \text{ If } ((|\text{Field}_{n-3}Y(n)-\text{Field}_{n-1}Y(n)|>\text{Threshold\_}Y)\lambda(|\text{Field}_{n-3}C(n)-\text{Field}_{n-1}C(n)|>\text{Threshold\_}C))$$
$$\text{Else } \{F_{n1}=0\}$$

$$\{F_{n2}=1\} \text{ If } ((|\text{Field}_{n-2}Y(n)-\text{Field}_{n}Y(n)|>\text{Threshold\_}Y)\lambda(|\text{Field}_{n-2}C(n)-\text{Field}_{n}C(n)|>\text{Threshold\_}C)) \text{ Else }$$
$$\{F_{n2}=0\}$$

As shown, the temporal luminance and/or chrominance differences are calculated as the pixels of the current field Field$_n$ 408 comes in. Accordingly only two comparators are needed when operating at pixel clock. In one embodiment, the Cb and Cr components are used for the temporal difference calculation. The difference is OR'ed with the Y difference and kept as a single map. However, as known in the art, the chrominance difference needs a different threshold than the Y component.

Figure 5:
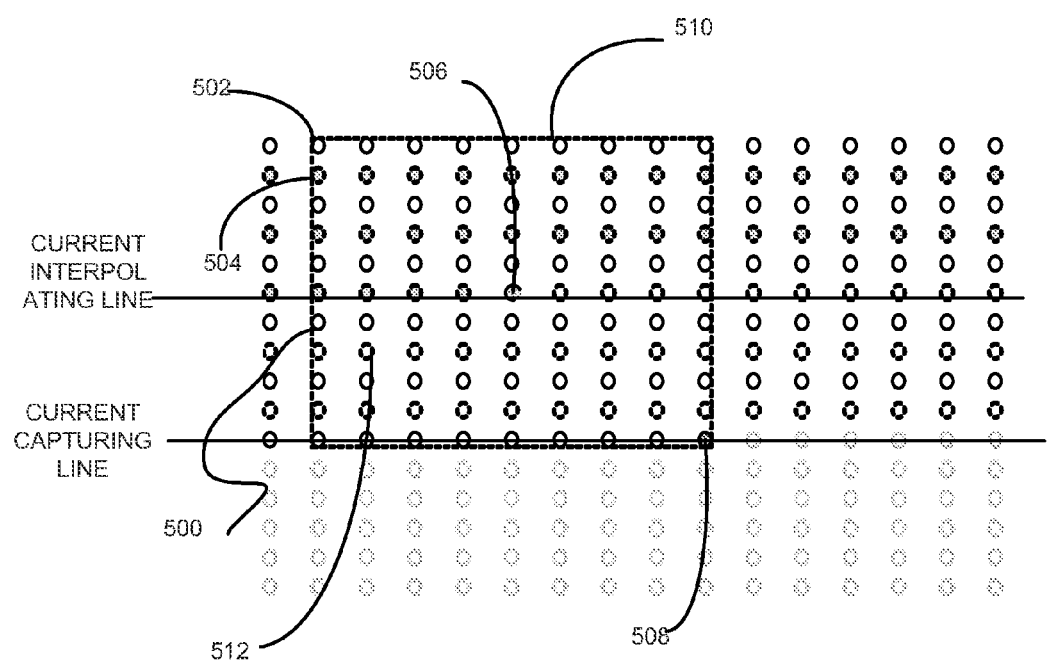
FIG. 5 generally illustrates one example of generating subframe level motion map at a latency of three lines and four pixels in accordance with one embodiment of the disclosure.

Now referring to FIG. 5, the relationships among captured pixels, pixels to be interpolated, currently being interpolated pixel and the currently being received pixel are illustrated. As shown, the current field 500 comprises captured pixels such as pixel 502, which has already been captured and goes to final frame buffer 104 because it does not need to be interpolated. The captured pixel 502 also goes to an interleaved field buffer, which is described in further details in FIG. 11, for interpolation of pixels yet to be interpolated such as pixel 512. Pixel 504 represents one of the pixels that were missing in the current field 500 but have been interpolated already. Pixel 506 is the pixel that is currently being either spatially or temporal interpolated based on the motion determination within a 9×9 search window 510, which is described in details in FIG. 6. Pixel 510 will go to the final frame buffer 104 once interpolated. Pixel 508 is the pixel that is currently being captured and goes to the final frame buffer 104. As seen from the position relationship between the pixel currently being captured 508 and the pixel currently being interpolated 506 in this example, the latency between the currently captured pixel and the currently being interpolated pixel is three lines plus four pixels multiplying the pixel clock frequency of the capturing device.

FIG. 6 illustrates an example of a search window. In this example, the 9(line)×9(pixel) search window 602 is centered on two representative pixels to be interpolated, e.g. pixel 606 and 608. It is noted that the size of a search window can be any combination of lines and pixels, e.g. 2×2, 3×3, 5×9 and so on. However, a bigger search window tends to produce better motion detection for the missing pixel than a smaller search window. The search area 610 represents one of possible search areas within the search window 602. To determine whether motion associated with the pixel to be interpolated 606 exists, areas of interest, such as search area 610, are combined with corresponding portions of the subframe level motion map. The result is a combination map with single bit Boolean value, i.e. "0" or "1", associated with each position in the search area. Motion vectors can be preferably generated by OR'ing each of the bits in the combination map as shown. In this example, search area 610 has some "1"s and therefore motion exists in search area 610. Also shown in FIG. 6 is search area 604, within which the pixels are all marked "0", and therefore no motion exists in the search area 604.

Figure 7:
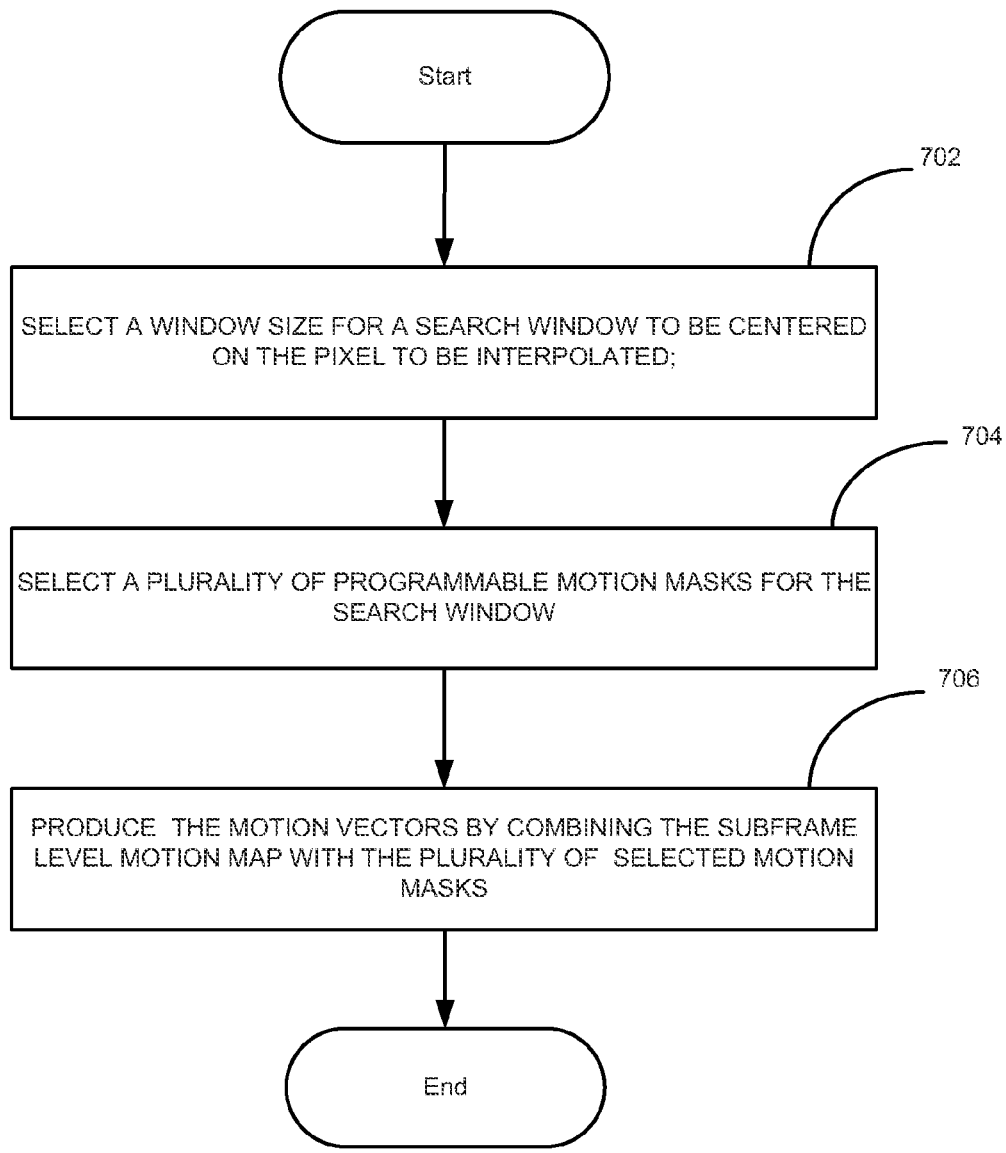
FIG. 7 generally illustrates a flow diagram of a method for producing motion vectors based on the subframe level motion map in accordance with one embodiment of the disclosure.
Figure 9:
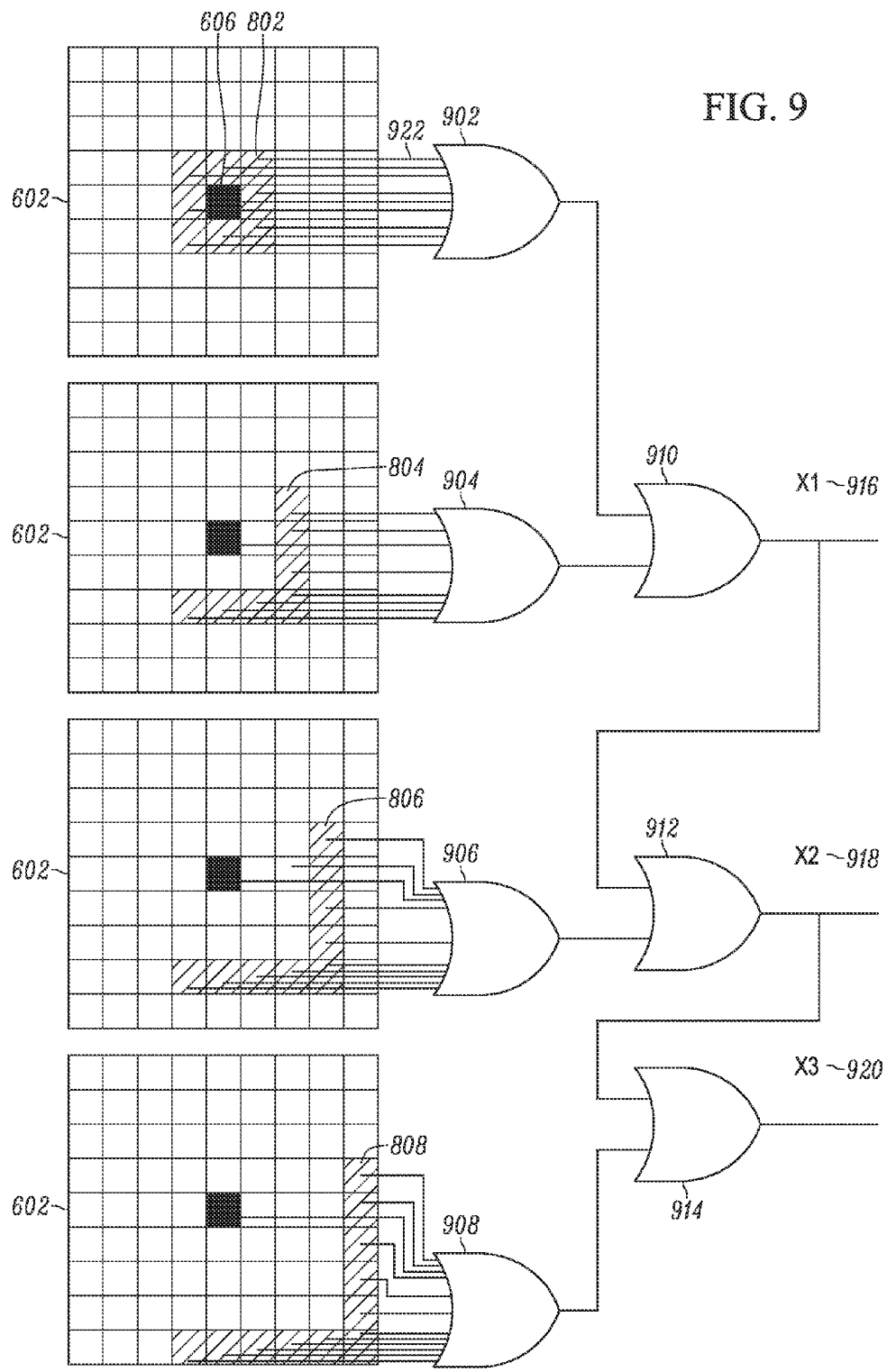
FIG. 9 generally illustrates a block diagram of generating motion vectors in accordance with one embodiment of the disclosure.

FIG. 7 illustrates an example of producing motion vectors associated with a subframe motion map. At block 702, in operation, the method of producing a plurality of motion vectors associated with the subframe level motion map by applying a plurality of motion masks, associated with a pixel to be interpolated, to the subframe level motion map includes selecting a window size for a search window, e.g. search window 510, to be centered on the pixel to be interpolated. FIGS. 8-9 will illustrate further details of producing motion vectors and motion value associated with the pixel currently being interpolated in accordance with one embodiment of the method described above. Referring back to FIG. 7, block 704 shows the method further includes selecting a plurality of programmable motion masks for the search window. At block 706, the method further includes producing the motion vectors by combining the subframe level motion map with the plurality of selected motion masks.

FIG. 8, in combination with FIG. 6, illustrates one example different masks of different shapes and sizes may be selected for a pixel to be interpolated, i.e. pixel 606. The various shaded areas shown in FIG. 8 represent many possible motion masks within a search window 602. Motion masks 802, 804, 806, 810, are 4 examples of such. Motion masks 802, 804, 806, 810 may be selected based on, for example, the sizes, shapes and number of motion masks associated with a pixel to be interpolated for different applications as generally known in the art. In this example, as shown, motion masks 802, 804, 806 and 810 are selected such that they cover the search area 610.

FIG. 9, in combination with FIGS. 6 and 8, illustrates one example of producing the motion vectors in accordance with one embodiment of the method described in block 706. As shown, the motion masks 802, 804, 806 and 810 are associated with pixel 606. Each of them covers an area of interest within the search window 602. Also as shown, each bit in the subframe level motion map 122 in the area of interest, i.e. an area covered by a motion mask, is AND'ed, with the corresponding bit of the motion mask. For clarity of illustrating this example, such AND operations are not depicted in FIG. 9. Take motion mask 802 for example, line 922 is a representative result of AND'ing one of the bits in the subframe level motion map 122 covered by the motion mask 802 with the corresponding bit the motion mask 802. As shown, such results like 922 are OR'ed together by an OR operation, such as 902, 904, 906 and 908. The result of each OR operation is OR'ed together again to produce a multiple of motion vectors, i.e. 916, 918 and 920. It is noted the operation represented by 902, 904, 906, 908, 916, 918, 920 and described herein elsewhere may be implemented by any suitable circuitry or logic as known in the art.

Figure 10:
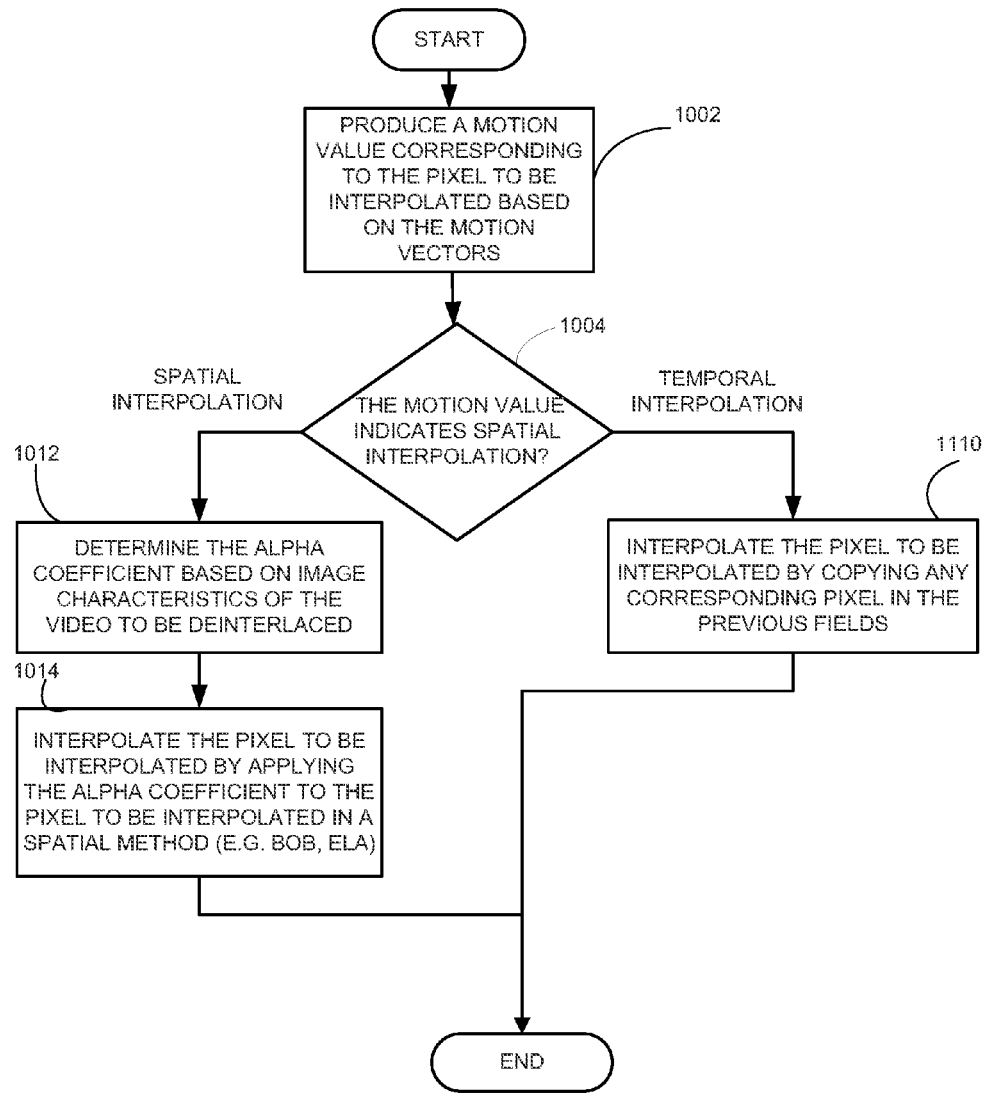
FIG. 10 is a flow diagram generally illustrating a method for adaptively interpolating the pixel to be interpolated in accordance with one embodiment of the disclosure.

The follow equations state the OR operations described in another way:

$$X1=OR(SUBFRAME\_LEVEL\_MOTION\_MAP[i][j]$$
$$AND\ MASK\_AREA\_0[i][j])$$

$$X2=OR(SUBFRAME\_LEVEL\_MOTION\_MAP[i][j]$$
$$AND\ MASK\_AREA\_1[i][j])$$

$$X3=OR(SUBFRAME\_LEVEL\_MOTION\_MAP[i][j]$$
$$AND\ MASK\_AREA\_2[i][j])$$

$$\ldots$$

$$Xn=OR(SUBFRAME\_LEVEL\_MOTION\_MAP$$
$$AND\ MASK\_AREA\_n[i][j]),$$

Where (i,j) denotes each position covered by the motion mask within a search window FIG. 10 illustrates an example of generating de-interlaced content by adaptively interpolating a missing pixel in accordance with the disclosure herein. At block 1002, the process may include producing a motion value corresponding to the pixel to be interpolated, i.e. the missing pixel, based on the motion vectors produced by the motion detection logic 132. This may be preferably done by OR'ing all the motion vectors associated with areas of interest selected by predefined motion masks within a search window, but it may also be done by any other suitable operations known in the art. As an illustration, referring to FIG. 6, the motion value for the area of interest, i.e. the search area 610 is "1" when all the bits in that area are OR'ed together to produce the motion value, which indicates that pixel 606 is surrounded by moving areas. Likewise, the motion value for the area of interest 604 is 0, which indicates pixel 608 is surrounded by static areas.

Referring back to FIG. 10, Block 1004 shows generating de-interlaced content by adaptively interpolating the pixel to be interpolated may further include determining whether to spatially or temporally interpolate the pixel to be interpolated based on the motion value. For example, if the motion value indicates that the pixel to be interpolated is surrounded by static areas, temporal operation, e.g. copying captured and stored pixels from previous fields, may be performed to interpolate the missing pixel, as shown in block 1110. If the motion value indicates that the pixel to be interpolated is surrounded by moving areas, spatial interpolation, e.g. "BOB" or "ELA", along with alpha blending may be performed to interpolate the missing pixel.

In the case when the motion value indicates spatial interpolation is needed, block 1012 shows generating de-interlaced content by adaptively interpolating the pixel to be interpolated further includes determining the alpha coefficient based on image characteristics of the video to be de-interlaced. The alpha coefficient determination may be made based on number of motion vectors are matched, i.e. indicating motion, for areas of interest associated with a pixel to be interpolated selected by predefined motion masks, or any other suitable techniques known in the art. For example, the value of alpha coefficient can be anywhere from 1 (total motion), 0.9, 0.8 ... to 0 (no motion). Between 0 and 1, the alpha coefficient values may be linear or non-linear in relation to the number of motion vectors matched. As an illustration, an example where four motion vectors x1, x2, x3, x4 are generated for areas of interest associated with a missing pixel is provided below. If x1 ... 4 are all marked as "1", then the value of alpha coefficient is set to "1". If any 3 of the 4 vectors are 1 then the alpha coefficient is set to 0.8. If none of the 4 vectors are 1 the there is no motion at all, the Alpha coefficient is set to 0. Alpha coefficient value may be linear or non-linear and its step size can be decided based on the image characteristics. The following equations may be used, for example, for a linear determination in relation to the number of motion vectors matched:

Alpha=0, if $\Sigma(Xi)$==0, for i=0 ... n, i.e. all Motion Vectors are 0, Alpha is set to 0

Alpha=1, if $\Sigma(Xi)$==N, for i=0 ... n, i.e. all Motion Vectors are 1, Alpha is set to 1

$$Alpha=0.1, if\ 0<\Sigma(Xi)<N/10, for\ i=0\ldots n$$

$$Alpha=0.2, if\ N/10<\Sigma(Xi)<2*N/10, for\ i=0\ldots n$$

$$Alpha=0.3, if\ 2*N/10<\Sigma(Xi)<3*N/10, for\ i=0\ldots n$$

$$Alpha=0.4, if\ 3*N/10<\Sigma(Xi)<4*N/10, for\ i=0\ldots n$$

$$Alpha=0.5, if\ 4*N/10<\Sigma(Xi)<5*N/10, for\ i=0\ldots n$$

$$Alpha=0.6, if\ 5*N/10<\Sigma(Xi)<6*N/10, for\ i=0\ldots n$$

$$Alpha=0.7, if\ 6*N/10<\Sigma(Xi)<7*N/10, for\ i=0\ldots n$$

$$Alpha=0.8, if\ 7*N/10<\Sigma(Xi)<8*N/10, for\ i=0\ldots n$$

$$Alpha=0.9, if\ 8*N/10<\Sigma(Xi)<9*N/10, for\ i=0\ldots n$$

Once the Alpha coefficient is determined when spatial interpolation is needed as indicated by the motion value, block 1014 shows generating de-interlaced content by adaptively interpolating the pixel to be interpolated further includes interpolating the pixel to be interpolated by applying the alpha coefficient to the pixel to be interpolated in a spatial interpolation method. For example, the value for the missing pixel $P_n(i,j)$ can be calculated as $P_n(i,j)=(alpha*P_n(i,j)$ (spatial))+$((1-alpha)*(P_{n-1}(i,j))$, where $P_n(i,j)$ is the pixel being interpolated using spatial algorithms such as "BOB", "ELA", or "modified ELA" or other spatial interpolation algorithms as generally known in the art, and $P_{n-2}(I,j)$ is the temporal pixel from previously received field of the same polarity, where the line corresponds to that pixel is stored in frame buffer. As an illustration, in the case when "BOB" is used, $P_n(i,j)$ is $(P_n(i-1,j)+P_n(i+1,j))/2$.

Figure 11:
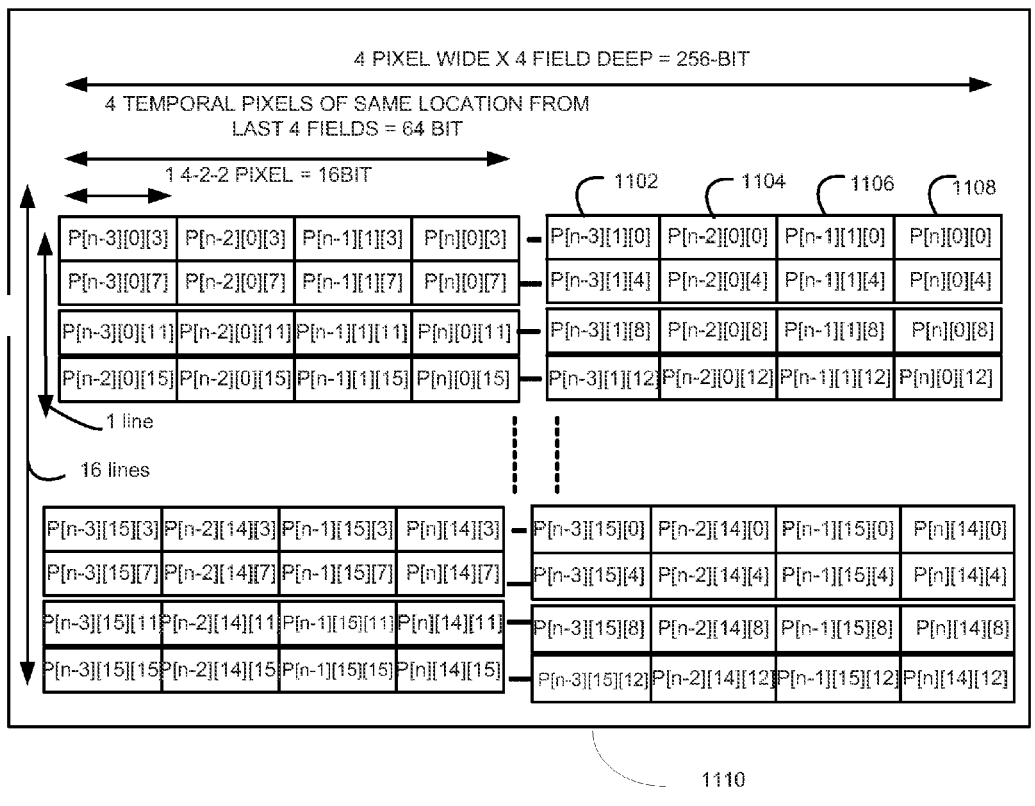
FIG. 11 generally illustrates one example of interleaving field data organization for generating subframe level motion map in accordance with one embodiment of the disclosure.

FIG. 11 illustrates an example of the method generating a subframe level motion map based on at least a portion of a current field and at least a portion of a plurality of previous fields may include a memory organization of the subframe level motion map by storing the plurality of pixels of the at least a portion of the current field and the at least a portion of the plurality of previous fields in a memory buffer by interleaving. As shown in FIG. 11, four temporal pixels of the same position from four consecutive fields, e.g. pixels 1102, 1104, 1106 and 1108, are arranged in an interleaving mode in memory storage. For example, in such an interleaving model, pixel 1102 from Field$_{n-3}$, pixel 1104 from Field$_{n-2}$, pixel 1106 from Field$_{n-1}$ and pixel 1108 from Field$_n$ are stored in consecutive memory locations in memory storage 1110. Unlike the linear memory organization used by traditional MAD techniques, the interleaving technique organizes the intermediate pixel data in this way such that memory access for intermediate pixel data for calculating the missing pixel can be minimized. Accordingly, when implemented, the interleaving memory organization of intermediate pixel data requires less design area, i.e. the area required to implement read/write clients, than the linear memory organization, e.g. the continuous field buffer, used by the traditional MAD techniques. Another advantage with this memory organization scheme is that design can fetch the required pixels from previous fields in a field buffer in single pixel clock and hence very simple control state machine can be designed to have a pipelined processing of pixels. Accordingly, this memory organization scheme leads to less implementation area of control state machine.

Figure 12:
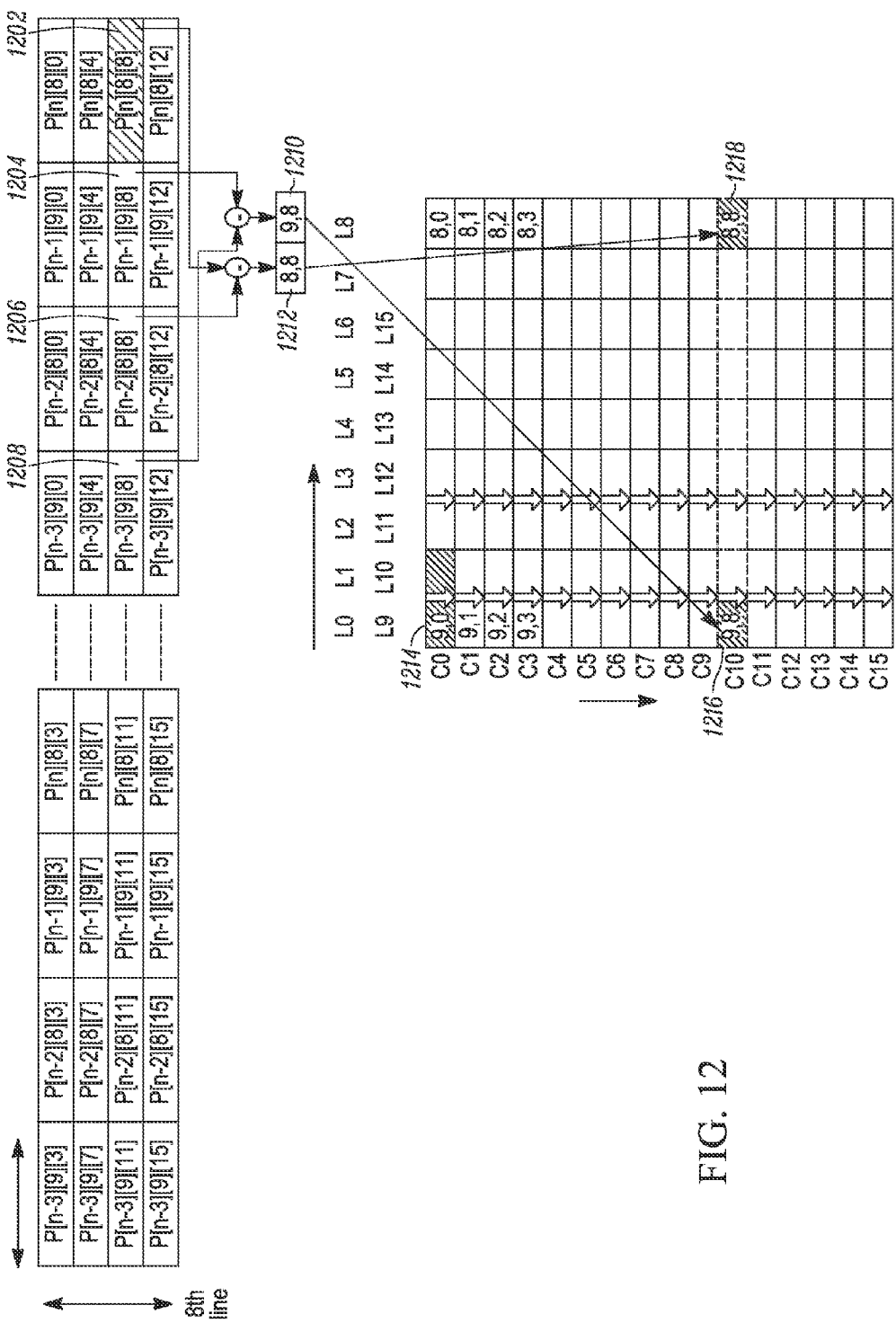
FIG. 12 generally illustrates one example of storing a subframe level motion map from the interleaved field data organization as shown in FIG. 10.

FIG. 12 illustrates one example of generating a subframe level motion map based on at least a portion of a current field and at least a portion of a plurality of previous fields may include storing the subframe level motion map in a memory storage, wherein a corresponding array in the memory storage holds a line of the subframe level motion map. As shown in this example, 1214 is a 16×9 memory storage, e.g. a SRAM, or any other suitable storage device known in the art suitable to store intermediate pixel data for MAD calculations. The memory storage 1214 is organized such that it can hold nine lines of single bit value in a subframe level motion map at any time. For instance, memory storage 1214 can hold a subframe level motion map of 16-pixels in a line, which is written to memory storage 1214 vertically, i.e. each line of memory storage 1214 holds a column of a subframe level motion map. Accordingly, the nine horizontal columns in the memory storage 1214 hold nine lines of 16-pixels in a subframe level motion map. In this example, pixel 1202 is the pixel being currently captured in a current field. Pixel 1202 has a position of (8,8) in the current field. Pixel 1206 is the another pixel associated with position (8,8) from $field_{n-2}$. The difference calculated according to method described above is shown as 1212, which is populated in the corresponding location 1218 in the 16×9 memory storage 1214. Similarly, pixel 1204 and 1208 are associated with position (9,8) and their difference 1210 is populated in the location 1216 in the 16×9 memory storage 1214.

Figure 13:
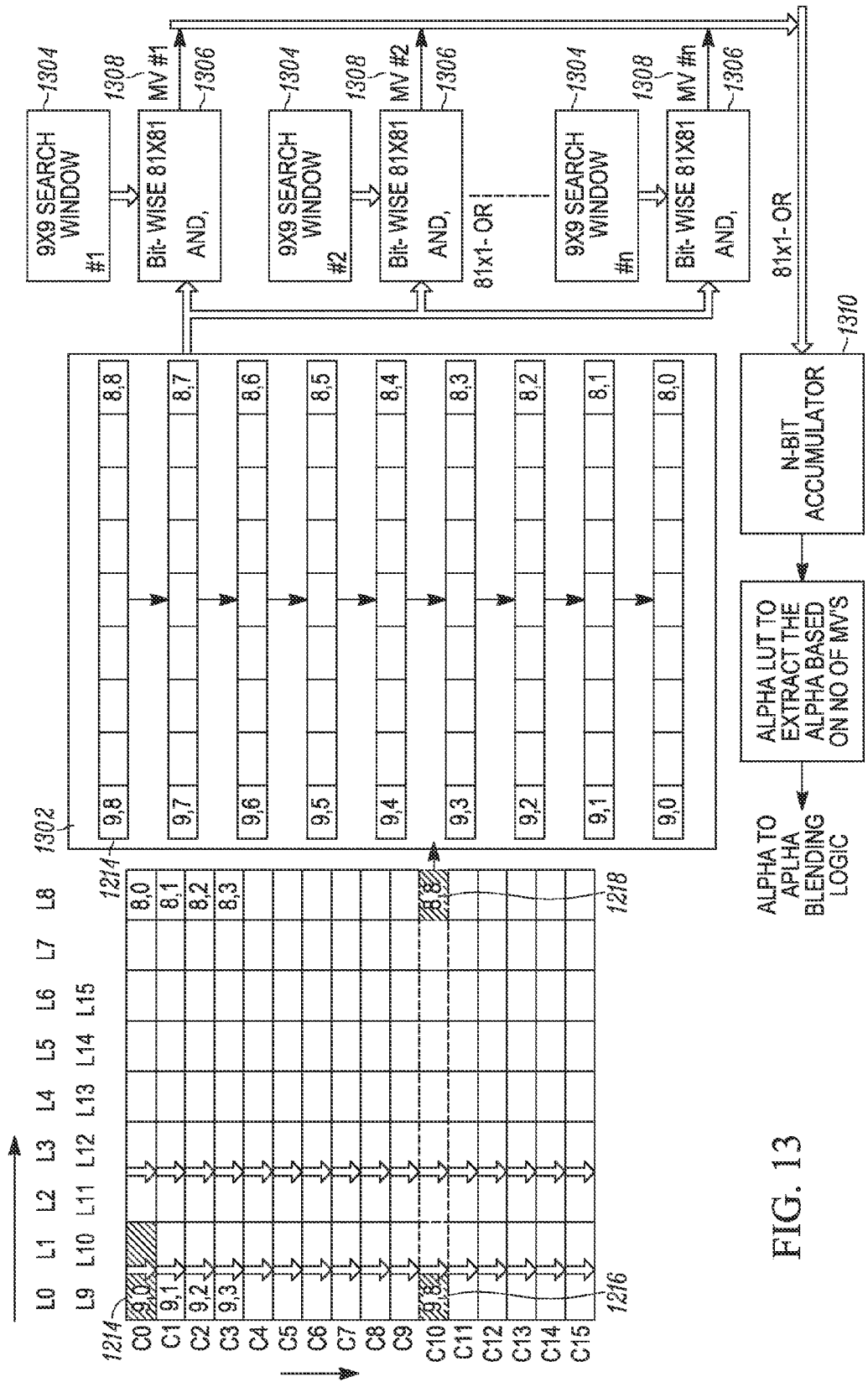
FIG. 13 generally illustrates one example of accessing a subframe level motion map from the interleaved field data organization as shown in FIG. 11.

FIG. 13 illustrates one example of generating a subframe level motion map based on at least a portion of a current field and at least a portion of a plurality of previous fields may further include outputting the subframe level motion map stored in the memory storage one array at a time to produce motion vectors for Alpha blending. As shown, values of a subframe level motion map are read from the memory storage 1214 to generate motion vectors and perform Alpha coefficient computation as described above. In this example, 1302 is a shifter that can read one line, i.e. a column in a subframe level motion map, in a 9×9 window of single bit map, such as a subframe level motion map, i.e. one column in the memory storage 1214, in one pixel clock. Now referring to FIG. 5, to interpolate a next missing pixel in a row in a 9×9 window, the 9×9 bit map window is right shifted by one column and requires next bit map corresponding to the next column (e.g. bit map row of 1216-1218 in FIG. 12) to be fetched. Accordingly, as shown, for every pixel clock, each column in the memory storage 1214 is read according to a search window, such as search window 1304, to generate motion vectors, such as motion vector 1308 through bit-wise operations, such as 1306, in accordance with the method described above. Also shown in this example, each of the resulting motion vectors are sent to an N-bit accumulator 1310 for the calculation of the number of motion vectors that are matched, i.e. motion detected. The number is sent to the alpha blending logic for further processing, such as calculating the Alpha coefficient as described above.

Figure 14:
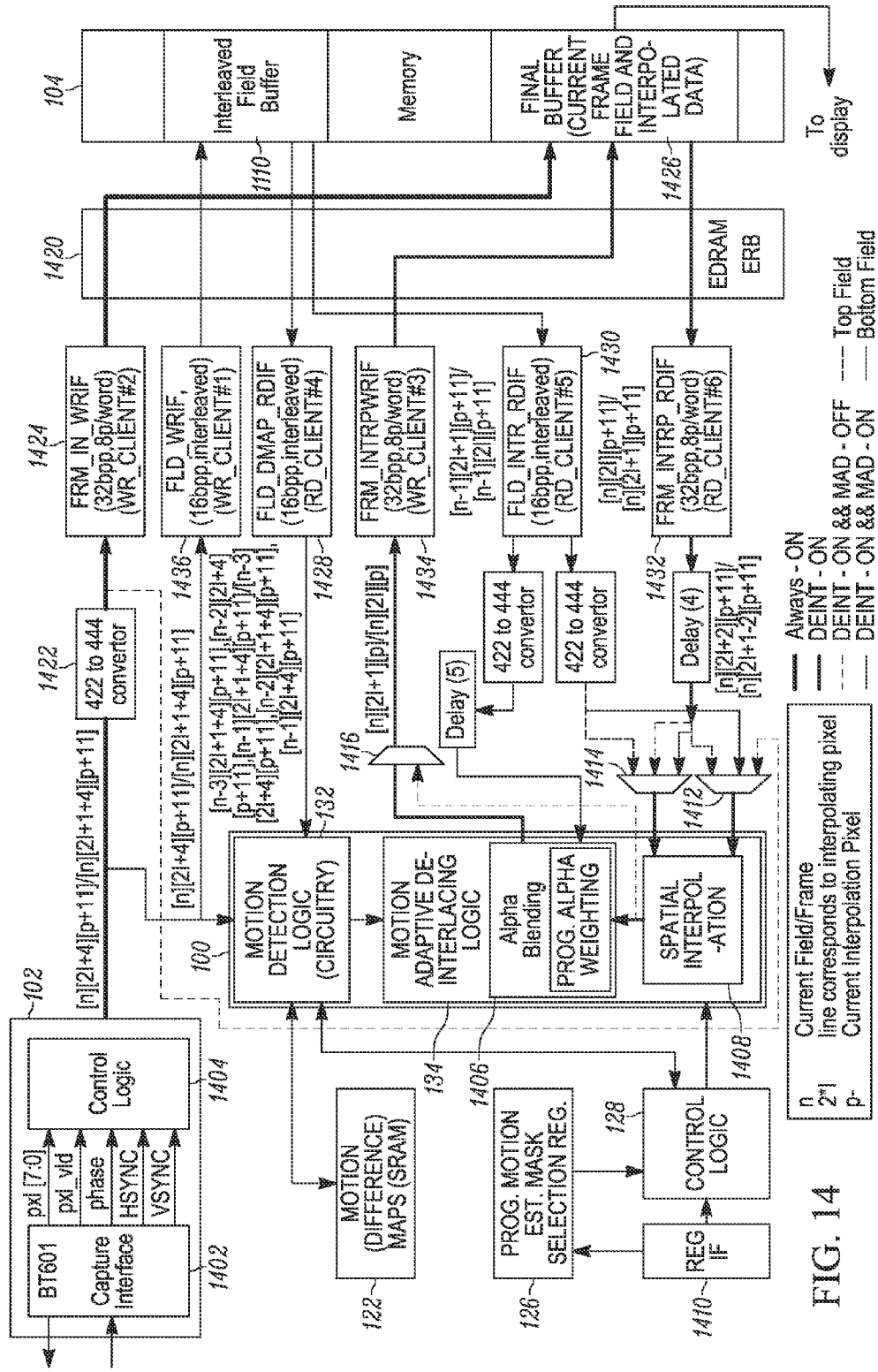
FIG. 14 generally depicts in more details the de-interlacing system as shown in FIG. 1.

FIG. 14 illustrates one embodiment of an apparatus that that performs adaptive de-interlacing at a subframe level using a subframe level motion map and shows in greater details one example of subframe level latency motion adaptive de-interlacer 100. Also shown in this example, a capture device 102 comprises a capture interface 1402 and control logic 1404. The control logic 1404 is operative to control the data path of captured field data. It is noted that the control logic 1404 may be implemented using any suitable structure including software, hardware, firmware or suitable combination thereof. In this example, the captured field data is written to a final field buffer 1426 in the frame buffer 104 by a write client 1424 via an arbiter 1420. Because in this example, the capture interface 1402 captures field data in 4:2:2 format, a 4:2:2-4:4:4 convertor 1422 converts the captured 4:2:2 field data into 4:4:4 format ready to be displayed. As shown, the control logic 1404 also is operative to send the captured field data to an interleaved field buffer 1110 in the frame buffer 104 by a write client 1436 via the arbiter 1420.

As shown in this example, the subframe level latency motion adaptive de-interlacer 100 includes motion detection circuitry 1423 and motion de-interlacing circuitry 1425. The motion detection circuitry 1423 is operative to receive field data in the currently captured field from the capture device 1402 via the capture control logic 1404. The motion detection circuitry 1423 is also operative to receive previously captured field data in the past fields from the interleaved field buffer 1110 via a read client 1428. The motion detection circuitry 1423 is further operative to generate subframe level motion map 122 in accordance with the method described above. The motion detection circuitry 1423 is further operative to produce motion vectors in accordance with the method described above. Further, the motion detection circuitry 1423 is operative to calculate motion value and Alpha coefficient in accordance with the method described above. In addition, the motion detection circuitry 1423 is operative to communicate with the control logic 128, which is operative to program patterns of predefined motion masks in the motion mask selection register 126, such as sizes and shapes, via a register interface 1410. The control logic 128 is also operative to enable or disable the subframe level latency motion adaptive de-interlacer 100. This may be done, for example, through a switching operating functionally shown as multiplexor 1412, 1414 and 1416.

As also shown in this example, the motion de-interlacing circuitry 1425 is operative to adaptively de-interlace field to be interlaced by applying temporal de-interlacing, e.g. copy missing pixel from previous fields, to static areas and/or applying spatial de-interlacing, such as "BOB" or "ELA" or other spatial interpolation algorithms as known in the art, to moving areas, based on the motion vectors and motion values generated by the motion detection circuitry 1423. The motion de-interlacing circuitry 1425 includes an Alpha blending logic 1406 that is operative to receive motion determination, e.g. motion vectors and motion values, from the motion detection circuitry 1423. The Alpha blending logic 1406 is operative to determine whether to temporally or spatially interpolate the missing pixels in accordance with the method described above. This may be done, for example, through a switching operating functionally shown as multiplexor 1416. In the case of spatial operation, spatial interpolation circuitry 1408 is operative to receive field data from interleaved field buffer 1110 via read client 1430 as well as from the final field buffer 1426 via read client 1432. The spatial interpolation circuitry 1408 is further operative to interpolate the missing pixels using spatial interpolation algorithms, such as "BOB", "ELA", or "modified ELA" in accordance with the method described above. Once spatial interpolation is done for the missing pixel, the spatial interpolation circuitry 1408 is operative to send the spatially interpolated pixel value for alpha blending to the Alpha blending logic 1406. The Alpha blending logic 1406 is operative to receive previous field data from the interleave field buffer 1110 via the read client 1430. In accordance with the Alpha blending method described above, the Alpha blending logic 1406 is operative to perform Alpha blending for the pixels to be interpolated and send the final interpolated pixels to the final field buffer 1426 via write client 1434.

Figure 15:
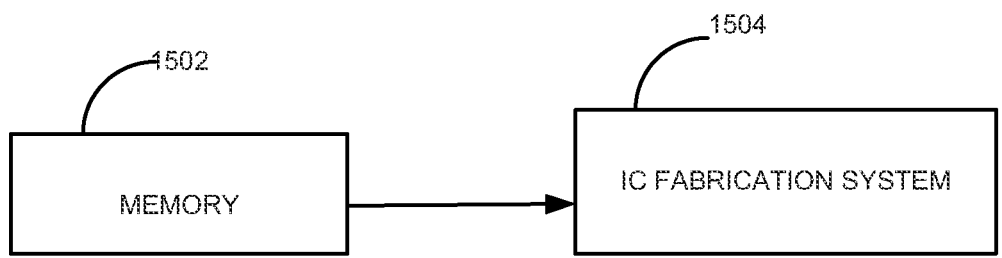
FIG. 15 is a block diagram generally depicting one embodiment of an integrated circuit fabrication system that may fabricate an integrated circuit in accordance with the disclosure.

As shown in FIG. 15, an integrated circuit fabrication system 1500 is shown which may include access to memory 1502 which may be in any suitable form and any suitable location accessible via the web, accessible via hard drive or any other suitable way. The memory 1502 is a non-transitory computer readable medium such as but not limited to RAM, ROM and any other suitable memory. The IC fabrication system may be or ore more work stations that control a wafer fabrication to build integrated circuits. The memory 1502 may include thereon instructions that when executed by one or more processors cause the integrated circuit fabrication system to fabricate an integrated circuit that includes the logic described herein.

The disclosed integrated circuit designs may be employed in any suitable apparatus including but not limited to, for example, game consoles, printers, high definition televisions, handheld devices, such as smart phones, tablets, portable devices such as laptops or any other suitable device. Such devices may include for example, a display that is operatively coupled to the integrated circuit where the integrated circuit may be, for example, a GPU, CPU or any other suitable integrated circuit that provides image data for output on the display. Such an apparatus may employ the integrated circuits as noted above for output on the displays. Such an apparatus may employ the integrated circuits as noted above including active memory circuit and memory state backup circuits as described as well as one or more of the described configurations.

Also, integrated circuit design system (e.g. work stations including, as known the art, one or more processors, associated memory in communication via one or more buses or other suitable interconnected and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium stores instructions executable by one or more integrated circuit design systems that cause the one or more integrated circuit design systems to produce an integrated circuit. the integrated circuit includes logic operative to generate a subframe level motion map based on at least a portion of a current field and at least a portion of plurality of previous fields, produce a plurality of motion vectors associated with the subframe level motion map by applying a plurality of motion masks, associated with a pixel to be interpolated, to the subframe level motion map, and generate deinterlaced content by adaptively interpolating the pixel to be interpolated for the current field based on the plurality of motion vectors produced by applying a plurality of motion masks to the subframe level motion map.

Advantages of the above method and apparatus include, but are not limited to, a shortened subframe level, i.e. less than one frame, latency for interlaced field to be de-interlaces, enhanced memory organization, and efficient accessing of intermediate field pixel data. The subframe level latency is achieved by efficiently generating and using a subframe level motion map to detect motion for each missing pixel within a search window centered on the missing pixel. In the case when a 9×9 search window is used, the latency is maintained at (3 lines+4 pixel) latency level. Accordingly, the above method and apparatus de-interlace interlaced video with a processing delay in the order of lines within a current field. In addition, memory organization and access of intermediate field pixel data for MAD calculation are enhanced such that interleaving organization and efficient accessing of intermediate field pixel data are achieved. It is recognized that such enhancement facilitates interpolating the pixels using data flow that is operated with single clock domain in a pipeline manner, which improves the efficiency of MAD operations.

The above detailed description of the method and apparatus and examples described therein have been presented for the purposes of illustration and description only and not by limitation. It is therefore contemplated that the present method and apparatus cover any and all modifications, variations or equivalents that fall within the spirit and scope of the basic underlying principles disclosed above and claimed herein.

What is claimed is:

1. A method, carried out by a device, for deinterlacing interlaced content comprising:
    generating a subframe level motion map based on at least a portion of a current field and at least a portion of a plurality of previous fields;
    producing a plurality of motion vectors associated with the subframe level motion map by applying a plurality of motion masks, associated with a pixel to be interpolated, to the subframe level motion map; and
    generating deinterlaced content by adaptively interpolating the pixel to be interpolated for the current field based on the plurality of motion vectors produced by applying a plurality of motion masks to the subframe level motion map.

2. The method of claim 1 wherein generating a subframe level motion map comprises:
    acquiring at least a portion of the current field and at least a portion of the plurality of previous fields;
    generating bimodal data for each position associated with a pixel in the current field, wherein one bimodal value indicates motion detected for the position and the other bimodal value indicates motion not detected for the position, by comparing the luminance and/or chrominance value of temporal differences between pixels associated with the position in the current field and the plurality of the previous fields with a threshold; and
    populating the subframe level motion map using the generated bimodal data.

3. The method of claim 2, wherein capturing at least a portion of the current field and at least a portion of the plurality of previous fields further comprises:
    acquiring at least three previous fields and at least five lines in the current field.

4. The method of claim 1 wherein producing a plurality of motion vectors associated with the subframe level motion map by applying a plurality of motion masks, associated with a pixel to be interpolated, to the subframe level motion map comprises:
selecting a window size for a search window to be centered on the pixel to be interpolated;
selecting a plurality of programmable motion masks for the search window; and
producing the motion vectors by combining the subframe level motion map with the plurality of selected motion masks.

5. The method of claim 4 wherein the plurality of motion masks are programmable using a control logic to select the size and/or the shape of the plurality of motion masks.

6. The method of claim 4 wherein the plurality motion masks in combination cover all pixels in the search window.

7. The method of claim 1, wherein generating a subframe level motion map based on at least a portion of a current field and at least a portion of a plurality of previous fields comprises:
storing the subframe level motion map in a memory storage, wherein a corresponding array in the memory storage holds a line of the subframe level motion map; and
outputting the subframe level motion map stored in the memory storage one array at a time.

8. The method of claim 2 wherein acquiring at least a portion of a current field and at least a portion of a plurality of previous fields comprises:
obtaining a plurality of pixels of the at least a portion of a current field and the at least a portion of a plurality of previous fields from a first memory buffer;
storing the plurality of pixels of the at least a portion of the current field and the at least a portion of the plurality of previous fields in a second memory buffer by interleaving; and
retrieving the interleaved pixels from the second memory buffer.

9. The method of claim 1 further comprising:
processing the deinterlaced content using a processing unit; and
providing a visual display of deinterlaced video based on the processed deinterlaced content provided by the processing unit.

10. The method of claim 1 wherein generating deinterlaced video by adaptively interpolating the pixel to be interpolated comprises:
producing a motion value corresponding to the pixel to be interpolated based on the motion vectors;
determining whether to spatially or temporally interpolate the pixel to be interpolated based on the motion value;
in response to a motion value indicating the pixel to be interpolated spatially, determining the alpha coefficient based on image characteristics of the video to be deinterlaced; and
interpolating the pixel to be interpolated by applying the alpha coefficient to the pixel to be interpolated in a spatial algorithm, when the motion value indicates to interpolate the pixel to be interpolated spatially, or interpolating the pixel to be interpolated by copying any corresponding pixel in the previous fields, when the motion value indicates to interpolate the pixel to be interpolated temporally.

11. A de-interlacer operative to de-interlace interlaced content comprising:
motion detection circuitry operative to generate a subframe level motion map based on at least a portion of a current field and at least a portion of a plurality of previous fields; and operative to produce a plurality of motion vectors associated with the subframe level motion map by applying a plurality of motion masks, associated with a pixel to be interpolated, to the subframe level motion map; and
de-interlacing circuitry operative to generate deinterlaced content by adaptively interpolating the pixel to be interpolated for the current field based on the plurality of motion vectors produced by applying a plurality of motion masks to the subframe level motion map.

12. The de-interlacer of claim 11 wherein generating a subframe level motion map comprises:
acquiring at least a portion of the current field and at least a portion of the plurality of previous fields;
generating bimodal data for each position associated with a pixel in the current field, wherein one bimodal value indicates motion detected for the position and the other bimodal value indicates motion not detected for the position, by comparing the luminance and/or chrominance value of temporal differences between pixels associated with the position in the current field and the plurality of the previous fields with a threshold; and
populating the subframe level motion map using the generated bimodal data.

13. The de-interlacer of claim 12 wherein capturing at least a portion of the current field and at least a portion of the plurality of previous fields further comprises:
acquiring at least three previous fields and at least five lines in the current field.

14. The de-interlacer in claim 11 wherein producing a plurality of motion vectors associated with the subframe level motion map by applying a plurality of motion masks, associated with a pixel to be interpolated, to the subframe level motion map comprises:
selecting a window size for a search window to be centered on the pixel to be interpolated;
selecting a plurality of programmable motion masks for the search window; and
producing the motion vectors by combining the subframe level motion map with the plurality of selected motion masks.

15. The de-interlacer of claim 14 wherein the plurality of motion masks are programmable by a control logic.

16. The de-interlacer in claim 14 wherein the plurality motion masks in combination cover all pixels in the search window.

17. The de-interlacer of claim 11, wherein generating a subframe level motion map based on at least a portion of a current field and at least a portion of a plurality of previous fields comprises:
storing the motion map in a memory storage, wherein a corresponding array in the memory storage holds a line of the subframe level motion map; and
outputting the motion map in the memory storage one array at a time.

18. The de-interlacer of claim 12 wherein acquiring at least a portion of a current field and at least a portion of a plurality of previous fields comprises:
obtaining a plurality of pixels of the at least a portion of a current field and the at least a portion of a plurality of previous fields from a first memory buffer;
storing the plurality of pixels of the at least a portion of the current field and the at least a portion of the plurality of previous fields in a second memory buffer by interleaving; and
retrieving the interleaved pixels from the second memory buffer.

19. The de-interlacer of claim 11 wherein generating deinterlaced video by adaptively interpolating the pixel to be interpolated comprises:
producing a motion value corresponding to the pixel to be interpolated based on the motion vectors;
determining whether to spatially or temporally interpolate the pixel to be interpolated based on the motion value;
in response to the motion value indicating interpolate the pixel to be interpolated spatially, determining the alpha coefficient based on image characteristics of the video to be deinterlaced; and
interpolating the pixel to be interpolated by applying the alpha coefficient to the pixel to be interpolated in a spatial algorithm, when the motion value indicates to interpolate the pixel to be interpolated spatially, or interpolating the pixel to be interpolated by copying any corresponding pixel in the previous fields, when the motion value indicates to interpolate the pixel to be interpolated temporally.

20. An apparatus comprising:
a de-interlacer operative to de-interlace interlaced content comprising:
motion detection circuitry operative to generate a subframe level motion map based on at least a portion of a current field and at least a portion of a plurality of previous fields; and operative to produce a plurality of motion vectors associated with the subframe level motion map by applying a plurality of motion masks, associated with a pixel to be interpolated, to the subframe level motion map; and
de-interlacing circuitry operative to generate deinterlaced content by adaptively interpolating the pixel to be interpolated for the current field based on the plurality of motion vectors produced by applying a plurality of motion masks to the subframe level motion map;
a processing device operative to process deinterlaced content generated by the deinterlacer; and
a display device operative to display processed deinterlaced video provided by the processing unit.

21. A non-transitory computer readable storage medium comprising executable instructions that when executed causes an integrated circuit fabrication system to fabricate an integrated circuit that comprises logic operative to:
generate a subframe level motion map based on at least a portion of a current field and at least a portion of a plurality of previous fields;
produce a plurality of motion vectors associated with the subframe level motion map by applying a plurality of motion masks, associated with a pixel to be interpolated, to the subframe level motion map; and
generate deinterlaced content by adaptively interpolating the pixel to be interpolated for the current field based on the plurality of motion vectors produced by applying a plurality of motion masks to the subframe level motion map.

22. The non-transitory of computer readable storage medium of claim 21, wherein generating a subframe level motion map comprises:
acquiring at least a portion of the current field and at least a portion of the plurality of previous fields;
generating bimodal data for each position associated with a pixel in the current field, wherein one bimodal value indicates motion detected for the position and the other bimodal value indicates motion not detected for the position, by comparing the luminance and/or chrominance value of temporal differences between pixels associated with the position in the current field and the plurality of the previous fields with a threshold; and
populating the subframe level motion map using the a result.

23. The non-transitory of computer readable storage medium of claim 21, wherein producing a plurality of motion vectors associated with the subframe level motion map by applying a plurality of motion masks, associated with a pixel to be interpolated, to the subframe level motion map comprises:
selecting a window size for a search window to be centered on the pixel to be interpolated;
selecting a plurality of programmable motion masks for the search window; and
producing the motion vectors by combining the subframe level motion map with the plurality of selected motion masks.

24. The non-transitory of computer readable storage medium of claim 21, wherein generating a subframe level motion map based on at least a portion of a current field and at least a portion of a plurality of previous fields comprises:
storing the subframe level motion map in a memory storage, wherein a corresponding array in the memory storage holds a line of the subframe level motion map; and
outputting the subframe level motion map stored in the memory storage one array at a time.

25. The non-transitory of computer readable storage medium of claim 22, wherein acquiring at least a portion of a current field and at least a portion of a plurality of previous fields comprises:
obtaining a plurality of pixels of the at least a portion of a current field and the at least a portion of a plurality of previous fields from a first memory buffer;
storing the plurality of pixels of the at least a portion of the current field and the at least a portion of the plurality of previous fields in a second memory buffer by interleaving; and
retrieving the interleaved pixels from the second memory buffer.

* * * * *